(12) United States Patent
Aubineau et al.

(10) Patent No.: US 10,074,154 B2
(45) Date of Patent: Sep. 11, 2018

(54) DISPLAY CONTROLLER AND A METHOD THEREOF

(71) Applicants: Vincent Aubineau, Areches (FR); Eric Eugene Bernard Depons, Saint Leger en Yvelines (FR); Michael Andreas Staudenmaier, Munich (DE)

(72) Inventors: Vincent Aubineau, Areches (FR); Eric Eugene Bernard Depons, Saint Leger en Yvelines (FR); Michael Andreas Staudenmaier, Munich (DE)

(73) Assignee: NXP USA, Inc., Austin, TX (US)

( * ) Notice: Subject to any disclaimer, the term of this patent is extended or adjusted under 35 U.S.C. 154(b) by 62 days.

(21) Appl. No.: 14/709,680

(22) Filed: May 12, 2015

(65) Prior Publication Data
US 2016/0171645 A1   Jun. 16, 2016

(30) Foreign Application Priority Data

Dec. 12, 2014   (WO) .................. PCT/IB2014/003052

(51) Int. Cl.
*G09G 5/39* (2006.01)
*G06T 1/60* (2006.01)
(Continued)

(52) U.S. Cl.
CPC ................ *G06T 1/60* (2013.01); *G06F 5/065* (2013.01); *G06F 13/1673* (2013.01);
(Continued)

(58) Field of Classification Search
CPC .......... G09G 5/393; G09G 5/39; G09G 5/363; G09G 5/395; G06T 1/60
(Continued)

(56) References Cited

U.S. PATENT DOCUMENTS

| 4,882,710 A | 11/1989 | Hashimoto et al. |
| 5,673,396 A | 9/1997 | Smolansky et al. |

(Continued)

OTHER PUBLICATIONS

Photoshop. Photoshop Elements > Layers >Separate RGB Channel Layers >5—Recombine RGB Channel Layers to Color, Sep. 23, 2013, [retrieved on Oct. 16, 2017]. Retrieved from the Internet: <URL: http://www.photokaboom.com/photography/learn/Photoshop_Elements/layers/separate_RGB_channel_layers/5_recombine_RGB_channel_layers.htm>.*

*Primary Examiner* — Ke Xiao
*Assistant Examiner* — Gordon Liu

(57) ABSTRACT

A display controller comprises a plurality of channels for fetching data from a memory, a plurality of buffers coupled to the channels for receiving the fetched data from the channels, a buffer controller for controlling the buffers and the channels, and a processing unit coupled to the buffers, the display and buffer controller for receiving the data from the buffers, outputting a control signal to the display based on the received data, and controlling the buffer controller, respectively. Each buffer has a respective fixed memory capacity for storing the fetched data. The processing unit activates layers in the output image for displaying an output image on the display. The channels correspond to associated layers. The buffer controller adds to the respective fixed memory capacity of a particular buffer associated to an activated layer, one further fixed memory capacity of at least one further buffer associated to an inactive layer.

16 Claims, 5 Drawing Sheets

(51) Int. Cl.
*G06F 5/06* (2006.01)
*G06F 13/42* (2006.01)
*G06F 13/40* (2006.01)
*G06F 13/16* (2006.01)

(52) U.S. Cl.
CPC ........ *G06F 13/404* (2013.01); *G06F 13/4282* (2013.01); *G06F 2205/067* (2013.01)

(58) Field of Classification Search
USPC .......................................................... 345/531
See application file for complete search history.

(56) References Cited

U.S. PATENT DOCUMENTS

| | | | |
|---|---|---|---|
| 5,771,356 A | 6/1998 | Leger et al. | |
| 5,841,722 A | 11/1998 | Willenz | |
| 5,978,866 A * | 11/1999 | Nain | G06F 13/28 710/22 |
| 6,298,422 B1 * | 10/2001 | Spilo | G06F 9/4843 711/151 |
| 6,344,852 B1 * | 2/2002 | Zhu | G06T 15/005 345/418 |
| 6,477,145 B1 | 11/2002 | Moore | |
| 7,373,437 B2 * | 5/2008 | Seigneret | G06F 13/28 709/212 |
| 7,548,586 B1 * | 6/2009 | Mimar | G06T 1/20 375/240.26 |
| 8,018,472 B2 * | 9/2011 | King | G09G 5/397 345/638 |
| 8,755,675 B2 * | 6/2014 | Direnzo | G06F 12/0284 386/247 |
| 2004/0236883 A1 | 11/2004 | Hough | |
| 2006/0256128 A1 * | 11/2006 | Rai | G09G 5/003 345/592 |
| 2012/0113261 A1 * | 5/2012 | Satoh | B60R 1/00 348/148 |

\* cited by examiner

DISPLAY CONTROLLER AND A METHOD THEREOF

CROSS REFERENCE TO RELATED APPLICATION(S)

The present application claims priority to International Patent Application No. PCT/IB2014/003052, entitled "A DISPLAY CONTROLLER AND A METHOD THEREOF," filed on Dec. 12, 2014, the entirety of which is herein incorporated by reference.

FIELD OF THE INVENTION

This invention relates to a display controller, display system, an integrated circuit device, an automotive vehicle, a method of controlling a display, a computer program product and a non-transitory tangible computer readable storage medium.

BACKGROUND OF THE INVENTION

In display controllers supporting layers or sprites, output images displayed, may be generated by activating said layers or sprites in the output image. The display is refreshed at a selected refresh rate, e.g. several times per second, often requiring relatively high speed data transfer from for example a memory to a processing unit. While the display is refreshed, said layers are activated and deactivated.

In order to reduce the latency requirement of the display controller, buffers are utilized to buffer data between the memory and the processing unit. The buffers pre-fetch the data from the memory and store the data temporarily therein until the processing unit can process the incoming data. New data can be fetched from the memory and stored in the buffers after the incoming data is processed. While the data is fetched, stored and processed, the display or a portion of the display is refreshed. Notoriously, the buffers have limited memory capacity and are costly components of the system.

In order to overcome these limitations several solutions have been proposed in literature. For example, in U.S. Pat. No. 5,841,722, a variable sized first-in first-out (FIFO) buffer is disclosed. The size of the disclosed FIFO is changed in accordance with how much data is present to be passed between a transferring system and a receiving system. The disclosed FIFO uses an external random access memory (RAM) of the system as an overflow memory when the FIFO buffer is temporarily full. A controller unit interfacing the FIFO buffer to the RAM performs access to the RAM.

However, U.S. Pat. No. 5,841,722 utilizes a RAM and a controller unit to read and write data in blocks when the FIFO is temporarily full, increasing system complexity and overall access time especially in systems, e.g. display systems, where relatively high speed data transfer is required.

SUMMARY OF THE INVENTION

The present invention provides a display controller, a display system, an integrated circuit device, an automotive vehicle, a method of controlling a display, a computer program product and a non-transitory tangible computer readable storage medium as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements, which correspond to elements already described, may have the same reference numerals.

DETAILED DESCRIPTION OF THE PREFERRED EMBODIMENTS

Figure 1:
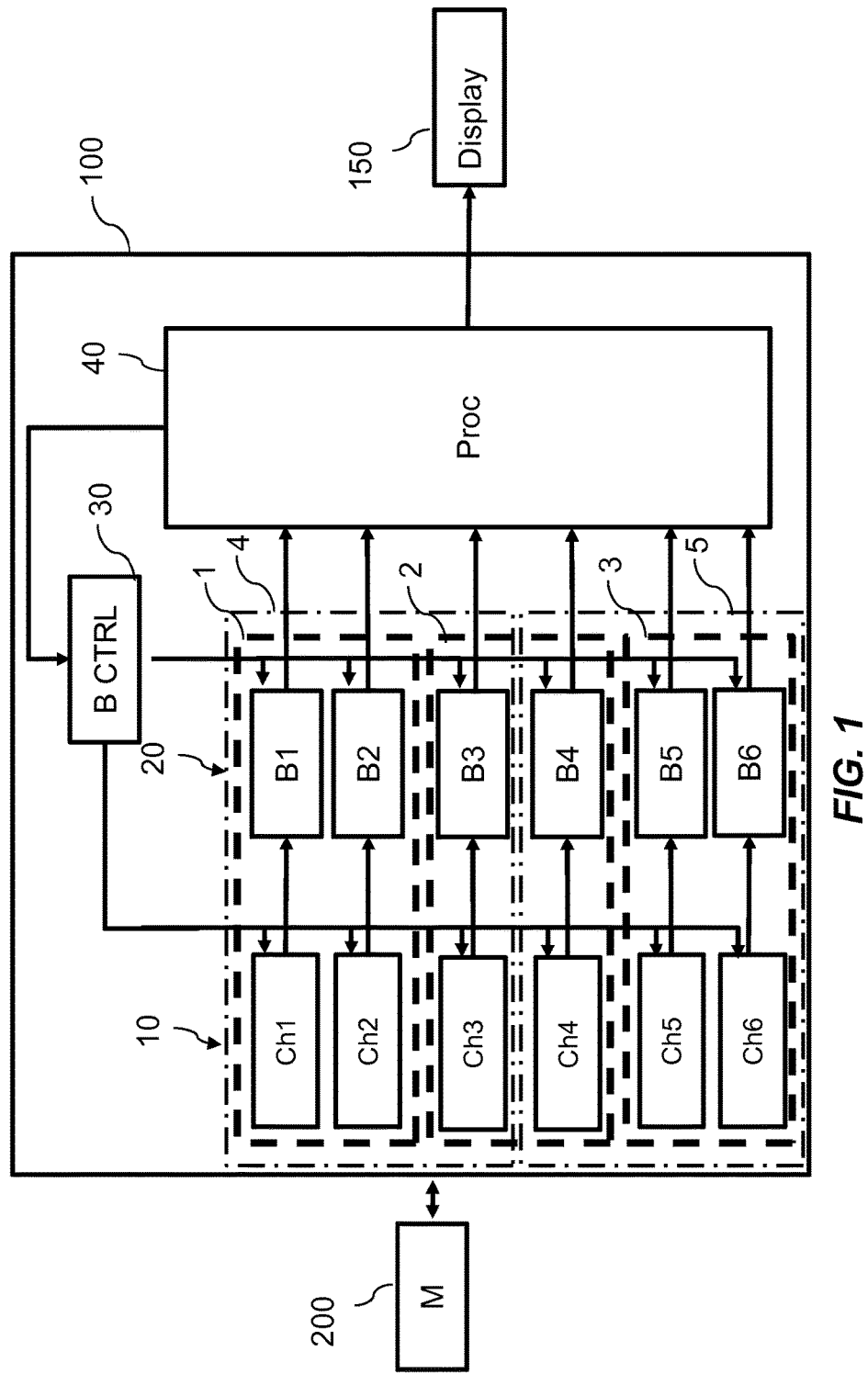
FIG. 1 schematically shows a first example of a display controller.

FIG. 1 schematically shows a first example of a display controller 100 for controlling a display 150. The display controller 100 is coupled to a memory 200 and to the display 150. The display controller 100 comprises a plurality of channels 10, a plurality of buffers 20 coupled to the plurality of channels 10, a buffer controller 30 coupled to the plurality of buffers 20 and the plurality of channels 10, and a processing unit 40 coupled to the buffers 20, the display 150 and the buffer controller 30.

The channels 10 fetch data from the memory 200. The channels 10 may be hardware blocks capable to request from the memory 200 the data to be fetched. For example, the channels 10 may retrieve from the processing unit 40, via e.g. the buffer controller 30, an address indicating the location of the data stored in the memory 200.

The buffers 20 receive the fetched data from the plurality of channels 10. Each buffer has a respective fixed memory capacity for storing the fetched data. The buffer controller 30 controls the plurality of buffers 20 and the plurality of channels 10, respectively. The processing unit 40 receives the data from the buffers 20. The processing unit 40 has a first output coupled to the display 150 for outputting a control signal to the display 150 based on the received data. The processing unit 40 has a second output coupled to the buffer controller 30 for controlling the buffer controller 30. The processing unit 40 is arranged to activate layers in the output image for displaying an output image on the display 150 via the control signal.

The display controller 100 allows to display basic unit areas, e.g. of rectangular shape, on the display 150. While the output image is displayed, said basic unit areas may be activated. These basic unit areas are the layers in the output image. The processing unit 40, based on the received data from the buffers 20, processes the activated layers, e.g. by giving priority to them and/or merging them when they are overlapping, and provides the control signal to the display 150 for displaying the output image.

The channels 10 and their coupled buffers 20 correspond to associated layers. The buffer controller 30 is arranged to add to the respective fixed memory capacity of a particular buffer coupled to a particular channel associated to an activated layer, one further fixed memory capacity of at least one further buffer coupled to a further channel associated to an inactive layer.

For example, as shown in FIG. 1, six channels Ch1 to Ch6 are coupled to the respective buffers B1 to B6. Each channel Ch1 to Ch6 and each respective buffer B1 to B6 is associated to a respective layer, e.g. in this example six layers. However, It may occur that not all six layers are activated in order to display the output image, but e.g. only three of them. In this example, each activated layer may borrow the buffer associated to an inactive layer. Activated layers 1, 2 and 3 are schematically indicated in FIG. 1 with thick dashed-lines boxes. Activated layer 1 is associated to the respective channels Ch1 and Ch2 and buffers B1 and B2, activated layer 2 is associated to the respective channels Ch3 and Ch4 and buffers B3 and B4, and activated layer 3 is associated to the respective channels Ch5 and Ch6 and buffers B5 and B6. As a consequence, in this example, each activated layer 1, 2 or 3 can use two buffers instead of one.

Since each buffer has a respective fixed memory capacity, usage of two buffers instead of one doubles the memory capacity. No extra hardware is required to double the memory capacity.

The activation and deactivation of said layers change over time, causing a change in the amount of data being transferred over time, i.e. the data rate, from the memory 200 to the processing unit 40. In a standard controller, the memory may not be able to cope with data rate changes because of e.g. bandwidth limitation of the system. For example one or more processors may simultaneously access a memory with limited transfer bandwidth. Eventually, when the display receives the data at relatively low data rate because e.g. of the system bandwidth limitation, the display cannot be refreshed properly and digital artifacts may occur on the display disturbing the visibility of the output image.

The display controller 100 prevents these digital artifacts to occur. The display controller 100 is less sensitive to data rate changes and system bandwidth limitation because provides an enhanced buffer memory capacity.

The buffer controller 30 may be arranged to monitor a first number of activatable layers of a particular output image. The inactive layer may be one or more layer of the activatable layers.

For example, the output image may be generated out of a maximum amount of activatable layers. While refreshing the display 150, the number of activated layers may change. Depending on the details displayed, all or some of the maximum number of activatable layers may be activated for a particular output image. Those layers remaining inactive free up their associated buffers in the display controller 100 such that the buffer memory capacity of the buffers associated to the activated layers may be multiplied by two or more the memory capacity of a single buffer. In this example the buffers 20 may be efficiently reconfigured, for example automatically, according to the time-changing latency requirements of the display controller 100.

In one example, the display controller 30 may be arranged to associate the first number of activatable layers to a first particular area of the particular output image. The particular output image may be composed of different areas of the display 150. For example, the particular output image may be composed of a first particular area and one or more second particular areas. The buffer controller 30 may be arranged to associate one or more second numbers of activatable layers to the one or more second particular areas of the output image. The one or more second numbers of activatable layers may be equal or lower than the first number of activatable layers. Although the particular output image may have a maximum number of activatable layers available for activation, the different areas of the same image may each use a number of activatable layers e.g. lower than the maximum number available for the output image. The buffer controller 30 may be arranged to associate a first number of activatable layers to the first particular area and a second number of activatable layers to the second particular area. When the reconfiguration of the buffers 20 depends on the activatable layers of the areas of the output image, the display controller 100 may be preconfigured such the particular areas of the output image are assigned to predetermined buffers. The display controller 100 may thus be simpler to configure; less hardware overhead may be required for its implementation.

Referring back to the example of FIG. 1, the first number of activatable layers for the output image may be six. In an example, the output image may be composed of two different areas: a first particular area and a second particular area. The first particular area may be e.g. the top part of the output image, and the second particular area may be e.g. the bottom part of output image. Each activatable layer has an associated buffer B1 to B6. The display controller 30 may be arranged to associate to e.g. the top part of the output image, two activatable layers, while to e.g. the bottom part of the output image, six activatable layers, i.e. in this example the maximum amount of activatable layers for the output image. The display 150 may receive with the control signal outputted from the processing unit 40 a stream of pixel values populating the display 150. Populating the display 150 may occur in a predetermined order, e.g. from top to bottom in a line-wise order. While populating the top part of the display 150, the buffer controller 30 may be arranged to add to the fixed memory capacity of the buffer B1 coupled to the channel Ch1 and associated to a first activated layer of the top part, the fixed memory capacity of the buffers B2 and B3. The buffers B2 and B3 may be associated to inactive layers of the top part of the output image. In FIG. 1, the thin dashed line 4 encloses the buffers B1, B2 and B3 and the channels Ch1, Ch2 and Ch3, associated to the first activated layer and to the two inactive layers associated to the buffers B2 and B3. Similarly, the buffer controller 30 may be arranged to add to the fixed memory capacity of the buffer B4 coupled to the channel Ch4 and associated to a second activated layer of the top part, the fixed memory capacity of buffers B5 and B6. The buffers B5 and B5 may be associated to inactive layers. In FIG. 1, the thin dashed line 5 encloses the buffers B4, B5 and B6 and the channels Ch4, Ch5 and Ch6, associated to the second activated layer of the top part and to the two inactive layers associated to the buffers B5 and B6. In this example, the display controller 100 may pre-fetch and temporarily store data for an amount equivalent to three times the memory capacity of a single buffer. Before beginning to populate the bottom part of the display 150, i.e. at the end of the last line of pixel stream of the top part of the output image, the buffers B1 to B6 may be flushed. At this point, the buffer controller 30 may be arranged to reconfigure the buffers B1 to B6 such that each buffer is associated to each activated layer, i.e. in this example six buffers are associated to six activated layers equivalent to the maximum number of activatable layers in the output image.

Alternatively, the buffer controller 30 may be arranged to associate different areas of the output image to different numbers of activatable layers. For example, the number of activatable layers for one area may be independent from the number of activatable layers for another area and independent from the number of activatable layers for the full output image. In other words, the number of activatable layers may be area-specific and not per se falling within a sub-range of the first number of activatable layers associated to the full output image. The inactive layer may be one or more of the area-specific activatable layers.

Figure 2:
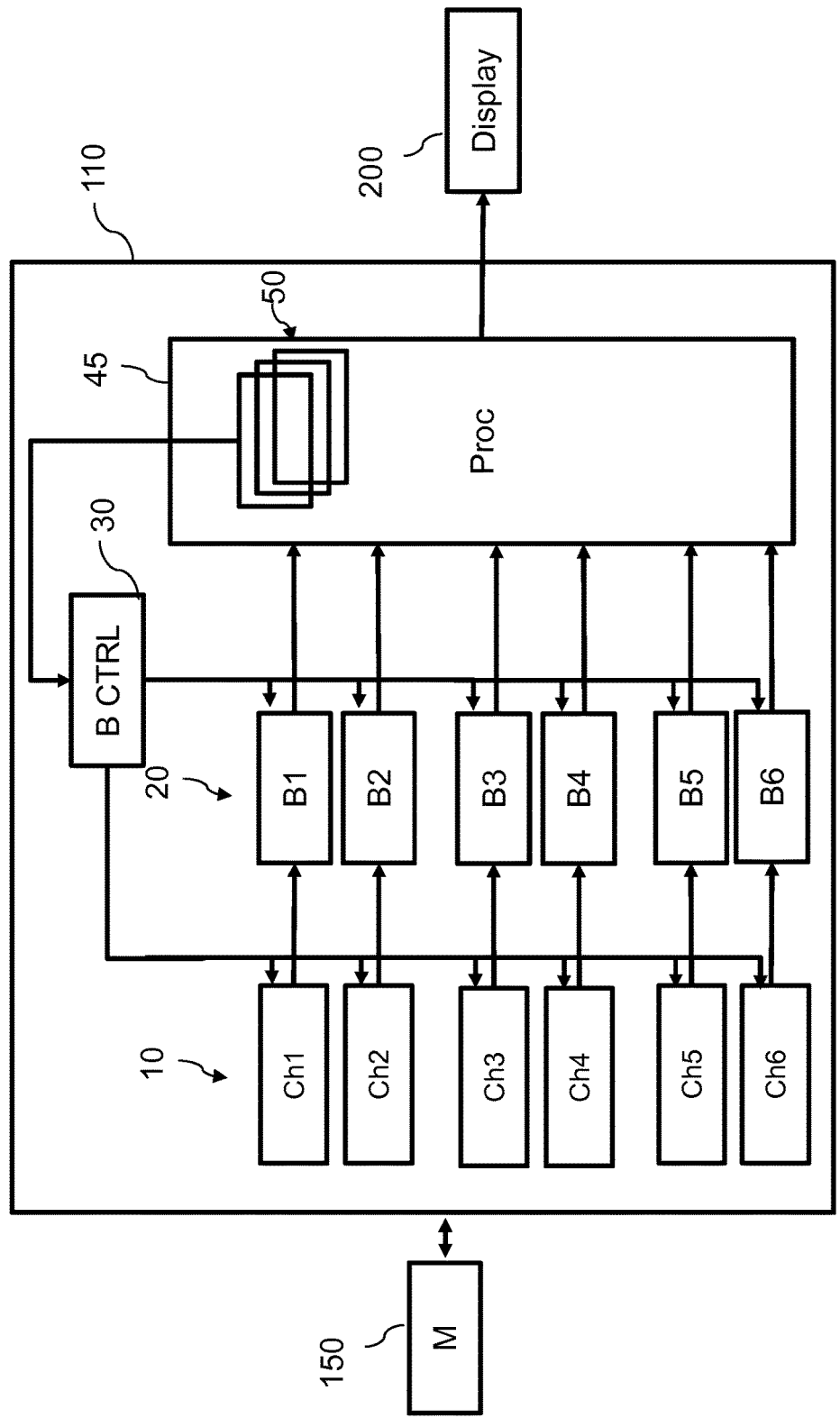
FIG. 2 schematically shows a second example of a display controller.

FIG. 2 shows a second example of a display controller 110. Elements in FIG. 2 having the same the number as in FIG. 1 have the same functionality as in FIG. 1 and will be herein below not described. The display controller 120 differs from the display controller 100 in that the display controller 120 comprises a processing unit 45. The processing unit 45 further comprise a plurality of programmable registers 50. For each activatable layer, there may one or more programmable registers associated with it. The programmable registers 50 store, for each activatable layer, a corresponding address associated to the respective channel for reading the data from the memory. For each activatable layer, the programmable registers 50 further store a data format, a size of the respective activatable layer, and a position of the respective activatable layer in the output image. The programmable registers 50 have respective outputs coupled to the buffer controller 30 for outputting to the buffer controller 30 the corresponding address, the data format, the size and position of the respective activatable layer. The number of registers 50 for a particular output image may be based on the number of activatable layers for that particular output image.

The programmable registers 50 may be configured for a particular area of the output image to store information related to that particular area of the image.

For example, the programmable registers 50 may further store parameters of the particular area. The parameter may be one or more of the group of parameters consisting of: a location in the display, a width, a height, a size of the particular area. The stored parameters may identify the particular area in the display. The corresponding address may identify a location of the data in the memory 150 such that the channels 10, by retrieving the address from the buffer controller 30, may read the data from the memory 150. The data read from the memory 150 may thus be associated to the particular area. The buffer controller 30 may reconfigure the buffers 20 for that particular area.

The buffers B1 to B6 described with reference to the examples of FIG. 1 and FIG. 2 may be any type of buffers suitable for the specific implementation. For example the buffers B1 to B6 may first-in first-out (FIFO) buffers. A FIFO buffer stores the fetched data transmitted by the respective channel until the processing unit 40 or 45 is ready to receive and process the data. A FIFO buffer provides time independence between the memory 200 from which data is fetched and the processing unit 40 or 45 whereto the data is received. The channels 10 may request data from the memory 200, transmit it to a FIFO buffer and the processing unit 45 may receive data out from the FIFO buffer in the order that it was transmitted.

Figure 3:
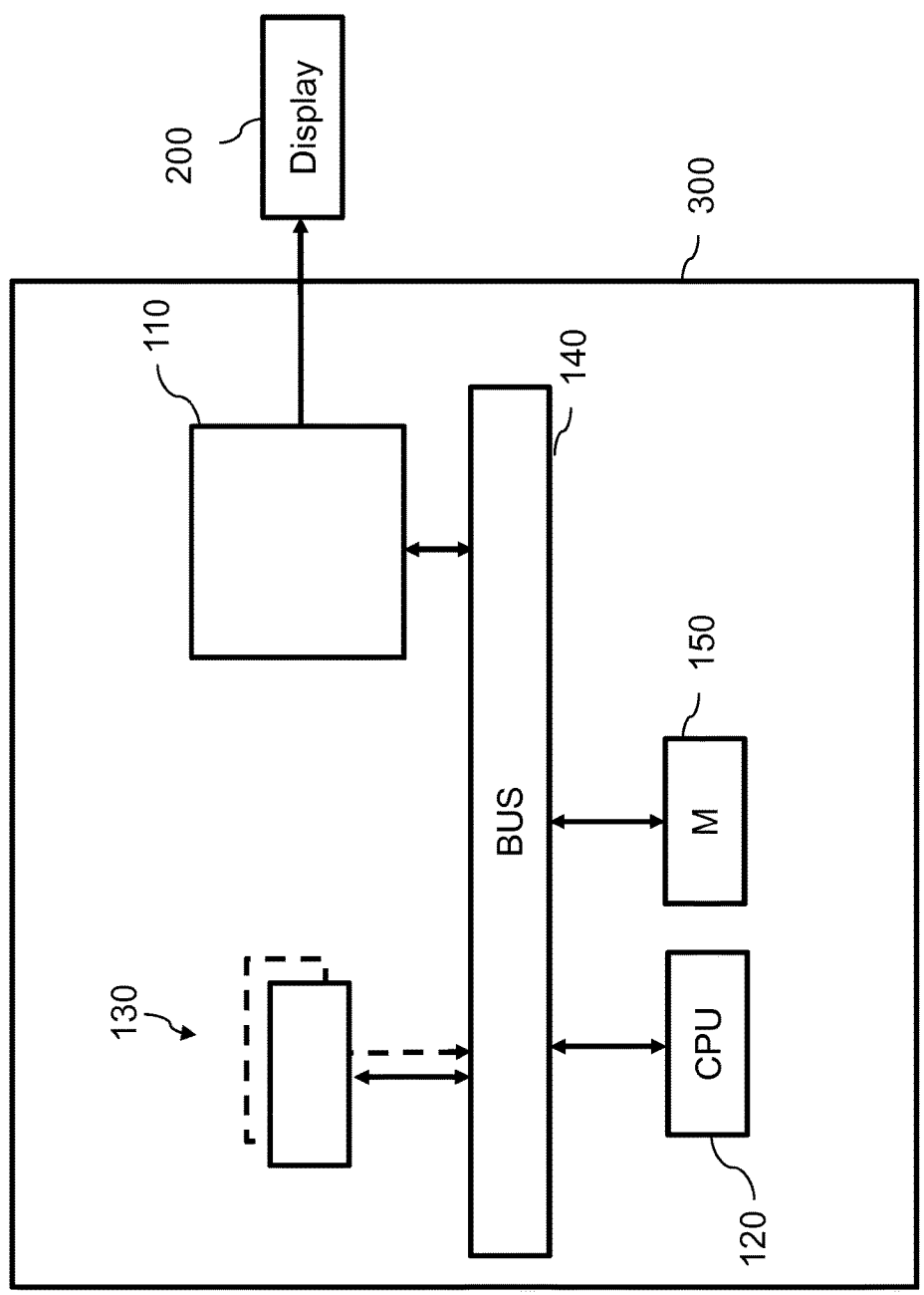
FIG. 3 schematically shows an example of a display system.

The memory 150 may be accessed in any manner suitable for the specific implementation. For example, FIG. 3 shows an example of a display system 300 in which the memory 150 is accessed via a system bus 140. The display system 300 comprises the memory 150, the system bus 140, the display controller 110 as described with reference to FIG. 2, a central processing unit 120 and one or more further processing units 130. The display controller 110, the central processing unit 120 and the one or more further processing units 130 are coupled to the memory via the system bus 140 for accessing data from the memory 150. The display controller 110 is coupled to the display 200 e.g. as shown in FIG. 1 and FIG. 2.

The display controller 110 and the one or more further processing units 130 are coupled to the central processing unit 120 and the memory 150 via the system bus 140.

The central processing unit (CPU) 120 and the one or more further processing units 130 may be any type of processor suitable for performing specific tasks in the display system 300. For example, the CPU 120 may e.g. be a digital processor capable to send and receive data and/or instructions to the display controller 110, the memory 150 and the one or more further processing unit 130 via the system bus 140.

The one or more further processing units 130 may be e.g. one or more graphic-processing units GPUs (Graphics Processing Units). The GPU may any of a 3D GPU, a 2D raster GPU, a dedicated image merger device, a Visual Processing Unit (VPU), a media processor, a specialized image digital signal processors or any other type of suitable processor or microprocessor.

The memory 150 may be any type of memory suitable for the specific implementation: e.g. a Double Data Rate (DDR) memory, a Single Data Rate (SDR) memory, a Graphics Double Data Rate (GDDR) memory, a Static Random Access Memory (SRAM), a flash memory or any other suitable memory.

The display controller 110 provides the interface between the system bus 140 and the display 200. The buffers (not shown in FIG. 3) in the display controller 110 are used for controlling the transfer of data between the system bus 140 and the display 200. The data comes from the memory 150 and is controlled by the CPU 120.

The display system 300 may be integrated in a device, e.g. an integrated circuit device. Alternatively, the integrated circuit device may comprise the display controller 110. Alternatively, the display system 300 may be integrated in separated devices, e.g. in integrated circuit devices electrically connected between them e.g. in a circuit board. In FIG. 3, the memory 150 has been drawn inside the display system 300. However, the memory 150 may be an external memory, e.g. provided by the user or manufacturer of the display system 300.

FIG. 3 shows only one memory 150. However, the display system 300 may comprise one or more memories. The one or more memories may be of different type, e.g. two memories, one DDR memory and one SRAM memory. Alternatively, in an example not shown in the FIGs, the one or more memories may be all external to the display system 300 or some of them internal and the remainder of them external to the display system 300.

The display system 300 may be used in any suitable applications.

Figure 4:
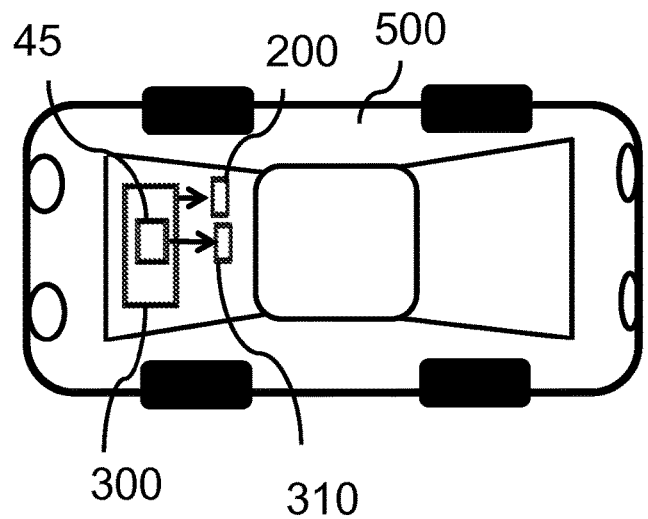
FIG. 4 shows a top view of an example of an automotive vehicle.

For example, FIG. 4 shows a top view of an example of an automotive vehicle 500 comprising the display system 300. The automotive vehicle further comprises the display 200 and a user interface 310 coupled to the processing unit 45 of the display controller 110 for outputting the output image to the display 200.

The user interface may be of any type suitable for the specific implementation. For example, the user interface 310 may be integrated in the display 200 as a touchscreen interface responding to a finger and/or multi-fingers touch of the user. The user interface 310 may be implemented with buttons, joystick-like apparatuses or via a touchscreen suitable to for example scroll, zoom-in, zoom-out the output image on the display 200.

Alternatively, the output image may be changed automatically, i.e. without a user input. For example the display 200 may enter a low-power mode based on external light conditions and/or power saving requirements.

The number of activatable layers in the output image may be based on the image outputted to the display. Changing a view on the display 200 to e.g. watch different type of parameters of the automotive vehicle 500, may trigger a particular number of activatable layers for that particular view. Thus, for example, the number of activatable layers may be re-configured by the user by changing the view on the display 200.

Figure 5:
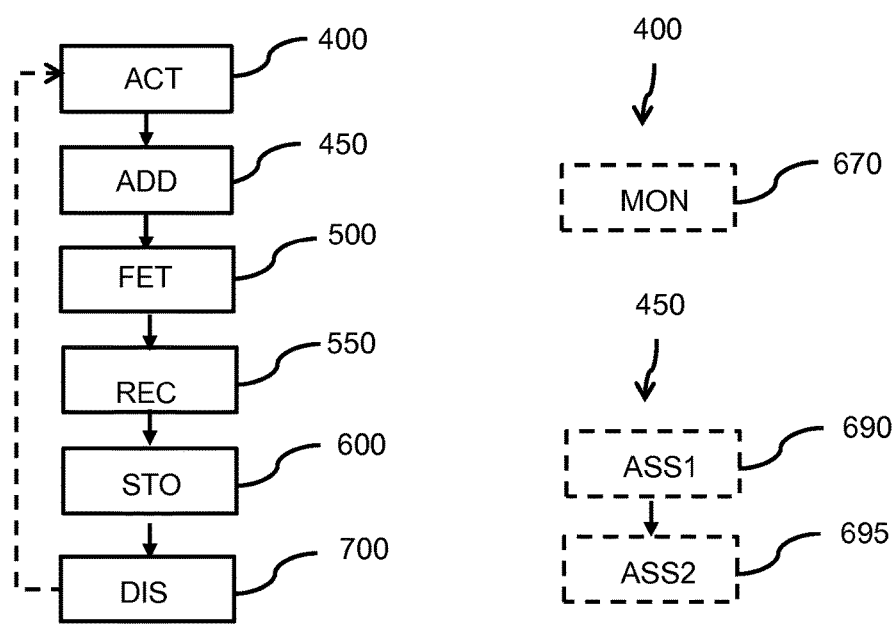
FIG. 5 schematically shows a flow diagram of a method of controlling a display.

FIG. 5 schematically shows a flow diagram of a method of controlling a display via a plurality of buffers. Each buffer has a respective fixed memory capacity.

The method comprises activating ACT 400 layers in an output image, wherein the buffers are associated to the respective layers, adding ADD 450 to the respective fixed memory capacity of a particular buffer associated to an activated layer, at least one further fixed memory capacity of at least one further buffer associated to an inactive layer, fetching FET 500 data from a memory, receiving REC 550 the fetched data, storing STO 600 the fetched data into a plurality of buffers wherein each buffer has a respective memory capacity, and displaying DIS 700 the output image on the display via a control signal outputted to the display, wherein the control signal is based on the received data and the activated layers. The activating ACT 400 the layers may further comprise monitoring MON 670 a first number of activatable layers of a particular image. Monitoring MON 670 may be performed before activating ACT 400. The inactive layer may be one or more of the activatable layers. The adding ADD 450 may comprise associating ASS1 690 the first number of activatable layers to a first particular area of the particular output image and associating ASS2 695 one or more second numbers of activatable layers to one or more second particular areas of the particular output image. The one or more second numbers of activatable layers may be equal or lower than the first number of activatable layers.

FIG. 5 shows an example of the sequential order of the actions 400 to 700 performed by the method. However, the order may be different. For example, while displaying DIS 700 the output image, the activation ACT 400 of the layers may occur. Similarly, while displaying DIS 700 the output image, the addition ADD 450 of the at least one further fixed memory capacity of the further buffer may also be performed. After displaying DIS 700 the output image, or a portion of it, a new activation ACT 400 cycle may start based on which the buffers may be again reconfigured.

The method of controlling the display may be implemented with the display controllers 100, 110 or the display system 300 described with reference to the FIGS. 1-3 or in any manner suitable for the specific implementation.

Figure 6:
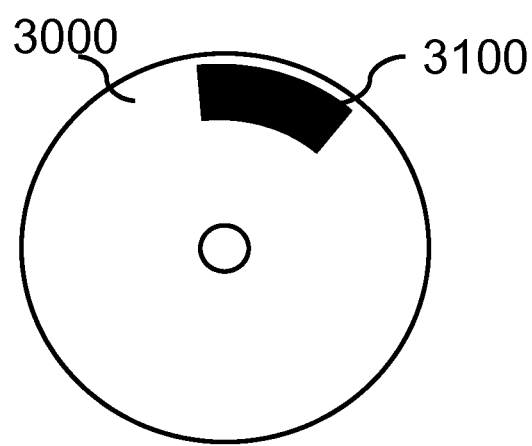
FIG. 6 schematically shows a non-transitory tangible computer readable storage medium.

FIG. 6 shows a computer readable medium 3000 comprising a computer program product 3100, the computer program product 3100 comprising instructions for causing a programmable apparatus to perform a method of controlling a display according to any one embodiment described above. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 6 as an optical disc, the computer readable medium 3000 may be any suitable computer readable medium, such as a hard disk, solid state memory, flash memory, etc., and may be non-recordable or recordable. The computer readable medium may be a non-transitory tangible computer readable storage medium. The computer readable medium may be a non-transitory tangible computer readable storage medium comprising data loadable in a programmable apparatus, the data representing instructions executable by the programmable apparatus, said instructions comprising one or more activate instructions for activating layers in an output image; a plurality of buffers is associated to the layers wherein each buffer has a respective fixed memory capacity; one or more add instruction for adding to the respective fixed memory capacity of a particular buffer associated to an activated layer, at least one further fixed memory capacity of at least one further buffer associated to an inactive layer; one or more fetch instruction for fetching data from a memory; one or more receive instructions for receiving the fetched data; one or more store instructions for storing the fetched data in the plurality of buffers; one or more displaying instructions for displaying the output image on the display via a control signal outputted to the display, wherein the control signal is based on the received data and the activated layers.

In the foregoing specification, the invention has been described with reference to specific examples of embodiments of the invention. It will, however, be evident that various modifications and changes may be made therein without departing from the scope of the invention as set forth in the appended claims.

The connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details have not been explained in any greater extent than that considered necessary, for the understanding and appreciation of the underlying concepts of the present invention and in order not to obfuscate or distract from the teachings of the present invention.

The invention may also be implemented in a computer program for running on a computer system at least including code portions for performing steps of a method according to the invention when run on a programmable apparatus, such as a computer system or enabling a programmable apparatus to perform functions of a device or system according to the invention. The term "program," as used herein, is defined as a sequence of instructions designed for execution on a computer system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

Furthermore, although FIGS. 1-4 and the discussion thereof describe an exemplary architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A display controller for controlling a display, comprising:
   a plurality of channels for fetching data from a memory;
   a plurality of buffers coupled to the plurality of channels for receiving the fetched data from the plurality of channels, each buffer having a respective fixed memory capacity for storing the fetched data;
   a buffer controller coupled to the plurality of buffers and the plurality of channels for controlling the buffers and the channels, respectively; and
   a processing unit coupled to the buffers for receiving the data from the buffers, to the display for outputting a control signal to the display based on the received data, and to the buffer controller for controlling the buffers and channels;
   the processing unit being arranged to activate layers in an output image for displaying the output image on the display via the control signal, the channels corresponding to associated layers, wherein the layers in the output image are stacked on top of each other;
   the buffer controller being arranged to reassign a first fixed memory capacity of a first buffer coupled to a first channel and currently assigned to an inactive layer to a second fixed memory capacity of a second buffer coupled to a second channel and assigned to an activated layer to add to the respective fixed memory capacity of the second buffer.

2. A display controller according to claim 1, the buffer controller being arranged to monitor a first number of activatable layers of a particular output image, the inactive layer being one or more of the activatable layers.

3. A display controller according to claim 2, the buffer controller being arranged to associate the first number of activatable layers to a first particular area of the particular output image.

4. A display controller according to claim 3, the buffer controller being arranged to associate one or more second numbers of activatable layers to one or more second particular areas of the particular output image, the one or more second numbers of activatable layers being equal or lower than the first number of activatable layers.

5. A display controller according to claim 3, the processing unit further comprising a plurality of programmable registers for storing, for each activatable layer, a corresponding address associated to the respective channel for reading the data from the memory, a data format, a size of the respective activatable layer, a position of the respective activatable layer, the programmable register having an output coupled to the buffer controller for outputting to the buffer controller the corresponding address, the data format, the size and the position of the respective activatable layer.

6. A display controller according to claim 5, the programmable register further storing a parameter of the particular area, the parameter being one or more of the group consisting of: a location in the display, a width, a height, a size of the particular area.

7. A display controller according to claim 1, the buffers being first-in first-out buffers.

8. A display system, comprising:

a display controller as claimed in claim 1, a memory, a system bus, a central processing unit and one or more further processing units, the display controller, the central processing units and the one or more further processing units being coupled to the memory via the system bus for accessing data from the memory.

9. A system comprising the display system as claimed in claim 8.

10. An automotive vehicle, comprising: a system as claimed in claim 8, a display and a user interface coupled to the processing unit for outputting the output image on the display, the number of activatable layers based on the outputted image.

11. A method of controlling a display via a plurality of buffers, each buffer having a respective fixed memory capacity, the method comprising:

activating layers of an output image, the buffers being associated to the layers, wherein the layers in the output image are stacked on top of each other, reassigning a first fixed memory capacity of a first buffer coupled to a first channel and currently assigned to an inactive layer to a second fixed memory capacity of a second buffer coupled to a second channel and assigned to an activated layer to add to the respective fixed memory capacity of the second buffer, fetching data from a memory, receiving the fetched data, storing the fetched data into the plurality of buffers, displaying the output image on the display via a control signal outputted to the display, the control signal based on the received data and the activated layers.

12. The method of claim 11, the activating further comprising:

monitoring a first number of activatable layers of a particular image, the inactive layer being one or more of the activatable layers.

13. The method of claim 12, the adding further comprising:

associating the first number of activatable layers to a first particular area of the particular output image.

14. The method of claim 13, the adding further comprising:

associating one or more second numbers of activatable layers to one or more second particular areas of the particular output image, the one or more second numbers of activatable layers being equal or lower than the first number of activatable layers.

15. A computer program product comprising instructions for causing a programmable apparatus to perform a method of controlling a display as claimed in claim 11.

16. A non-transitory tangible computer readable storage medium comprising data loadable in a programmable apparatus, the data representing instructions executable by the programmable apparatus, said instructions comprising:

one or more activate instructions for activating layers in an output image, a plurality of buffers being associating to the layers, each buffer having a fixed memory capacity, wherein the layers in the output image are stacked on top of each other, one or more add instructions for reassigning a first fixed memory capacity of a first buffer coupled to a first channel and currently assigned to an inactive layer to a second fixed memory capacity of a second buffer coupled to a second channel and assigned to an activated layer to add to the respective fixed memory capacity of the second buffer, one or more fetch instructions for fetching data from a memory, one or more receive instructions for receiving the fetched data, one or more store instructions for storing the fetched data in a plurality of buffers, each buffer having a respective fixed memory capacity, one or more display instructions for displaying the output image on the display via a control signal outputted to the display, the control signal being based on the received data and the activated layers.

* * * * *